US009497654B2

(12) United States Patent
Shen et al.

(10) Patent No.: US 9,497,654 B2
(45) Date of Patent: Nov. 15, 2016

(54) METHODS AND APPARATUS FOR NETWORK ENTITY COLLISION DETECTION

(71) Applicant: QUALCOMM Incorporated, San Diego, CA (US)

(72) Inventors: Cong Shen, San Diego, CA (US); Andrei Dragos Radulescu, San Diego, CA (US); Rajat Prakash, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/177,778

(22) Filed: Feb. 11, 2014

(65) Prior Publication Data

US 2015/0063137 A1     Mar. 5, 2015

Related U.S. Application Data

(60) Provisional application No. 61/873,629, filed on Sep. 4, 2013.

(51) Int. Cl.
*H04W 24/02* (2009.01)
*H04W 24/10* (2009.01)
(Continued)

(52) U.S. Cl.
CPC ............. *H04W 24/10* (2013.01); *H04W 24/08* (2013.01); *H04W 48/12* (2013.01); *H04W 24/02* (2013.01); *H04W 36/0083* (2013.01); *H04W 48/16* (2013.01)

(58) Field of Classification Search
CPC ..... H04W 4/00; H04W 24/00; H04W 24/02; H04W 24/10; H04W 24/08; H04W 48/12

USPC ........... 370/252, 328, 329; 455/422.1, 435.3, 455/436, 73, 517
See application file for complete search history.

(56) References Cited

U.S. PATENT DOCUMENTS

2010/0178912 A1    7/2010  Gunnarsson et al.
2010/0297955 A1*  11/2010  Marinier ........... H04W 36/0061
                                                                 455/73
(Continued)

FOREIGN PATENT DOCUMENTS

WO    WO-2009/043216 A1    4/2009
WO    WO-2010/120837 A1    10/2010
(Continued)

OTHER PUBLICATIONS

International Search Report and Written Opinion—PCT/US2014/053423—ISA/EPO—Feb. 5, 2015. (17 total pages).
(Continued)

*Primary Examiner* — Charles C Jiang
*Assistant Examiner* — Wali Butt
(74) *Attorney, Agent, or Firm* — Arent Fox LLP

(57) ABSTRACT

Methods and apparatus for communication at a network entity comprise receiving one or more technology layer measurements during a measurement period. The methods and apparatus further comprise determining that a first subset of the one or more technology layer measurements satisfies an adequate user equipment (UE) communication condition. In addition, the methods and apparatus comprise determining that a second subset of the one or more technology layer measurements satisfies at least one measurement threshold value. Moreover, the methods and apparatus comprise identifying a network entity conflict when the first subset of the one or more technology layer measurements satisfies the adequate UE communication condition and the second subset of the one or more technology layer measurements satisfies the at least one measurement threshold value.

22 Claims, 14 Drawing Sheets

(51) Int. Cl.
*H04W 48/12* (2009.01)
*H04W 24/08* (2009.01)
*H04W 36/00* (2009.01)
*H04W 48/16* (2009.01)

(56) References Cited

U.S. PATENT DOCUMENTS

| | | | |
|---|---|---|---|
| 2010/0317351 | A1 | 12/2010 | Gerstenberger et al. |
| 2010/0323627 | A1 | 12/2010 | Alanara |
| 2011/0205982 | A1 | 8/2011 | Yoo et al. |
| 2011/0286346 | A1 | 11/2011 | Barbieri et al. |
| 2012/0099442 | A1 | 4/2012 | Bakker et al. |
| 2012/0113961 | A1 | 5/2012 | Krishnamurthy |
| 2012/0115459 | A1* | 5/2012 | Deng ............... H04W 36/0094 455/422.1 |
| 2012/0236741 | A1* | 9/2012 | Xu ..................... H04B 7/024 370/252 |
| 2012/0275315 | A1 | 11/2012 | Schlangen et al. |
| 2013/0005339 | A1* | 1/2013 | Iwamura ............ H04W 48/20 455/436 |
| 2013/0040640 | A1* | 2/2013 | Chen ................ H04W 36/30 455/434 |
| 2013/0225168 | A1 | 8/2013 | Singh et al. |
| 2013/0235812 | A1 | 9/2013 | Heo et al. |
| 2013/0265939 | A1* | 10/2013 | Pedersen et al. ............ 370/328 |
| 2014/0274029 | A1 | 9/2014 | Radulescu et al. |
| 2015/0063136 | A1* | 3/2015 | Shen .................. H04W 24/02 370/252 |

FOREIGN PATENT DOCUMENTS

| | | | |
|---|---|---|---|
| WO | WO-2011/057037 | A2 | 5/2011 |
| WO | WO-2013/071813 | A1 | 5/2013 |
| WO | WO-2014/070101 | A1 | 5/2014 |
| WO | WO 2014070101 | A1 * | 5/2014 |

OTHER PUBLICATIONS

Motorola: "Impact of HeNB interference on paging channel performance", 3GPP Draft; R4-092399, 3rd Generation Partnership Project (3GPP), Mobile Competence Centre; 650, Route Des Lucioles; F-06921 Sophia-Antipolis Cedex ; France, no. Los Angeles, CA; Jun. 25, 2009, XP050353633, [retrieved on Jun. 25, 2009].
Motorola: "SIR Metric for Idle Mode Reselection Enhancements", 3GPP Draft; R4-094632, 3rd Generation Partnership Project (3GPP), Mobile Competence Centre; 650, Route Des Lucioles; F-06921 Sophia-Antipolis Cedex; France, no. Jeju; Nov. 9, 2009. Nov. 8, 2009, XP050394124, [retrieved on Nov. 17, 2009] p. 1-3.
Nokia et al: "Additional analyses of methods to handle non-allowed CSG cells in LTE", 3GPP Draft; R4-093857, 3rd Generation Partnership Project (3GPP), Mobile Competence Centre; 650, Route Des Lucioles; F-06921 Sophia-Antipolis Cedex; France, no. Miyazaki; Oct. 12, 2009, XP050393443, [retrieved on Oct. 19, 2009] p. 2, paragraph 2.2.
Qualcomm Europe: "RSRQ measurement requirement in idle mode", 3GPP Draft; R4-091895 RSRQ Measurement in Idle Mode, 3rd Generation Partnership Project (3GPP), Mobile Competence Centre; 650, Route Des Lucioles; F-06921 Sophia-Antipolis Cedex; France , no. San Francisco; May 4, 2009, XP050342623, [retrieved on May 4, 2009] cited in the application the whole document.
Qualcomm Europe: "UE-assisted heuristic detection of PCI collision", Sep. 23, 2008, 3GPP Draft; R2-085380 UE Assisted Heuristic Collision Detection, 3rd Generation Partnership Project (3GPP), Mobile Competence Centre; 650, Route Des Lucioles; F-06921 Sophia-Antipolis Cedex; France, XP050320229, [retrieved on Sep. 23, 2008].
Email Discussion Rapporteur (Motorola): "[65b-3]: Inbound CSG mobility—Email Discussion Summary", 3GPP Draft, R2-093135_H(E) NB_Inbound_Mobility_Email_V7, 3rd Generation Partnership Project (3GPP), Mobile Competence Centre, 650, Route Des Lucioles, F-06921 Sophiaantipolis Cedex, France, vol. RAN WG2, No. 66 San Francisco, U.S.A., May 4-8, 2009, May 4, 2009, 22 Pages.
Email Discussion Rapporteur (Motorola): "[66#9] LTE-UMTS: Inbound Mobility to CSG cell from LTE Cell", 3GPP Draft, R2-093920_H(E) NB_Inbound_Mobility_From_LTE_ V9, 3rd Generation Partnership Project (3GPP), Mobile Competence Centre, 650, Route Des Lucioles, F-06921 Sophiaantipolis Cedex , France, vol. RAN WG2 No. 66bis Los Angeles, USA, Jun. 29-Jul. 3, 2009, Jun. 29, 2009, 29 Pages.
LG Electronics Inc: "MUE ABS Configuration Under Possible PCI Confusion of Femto Cells", 3GPP Draft, R2-110453 MUE ABS Configuration Under Possible PCI Confusion of Femto Cells, 3rd Generation Partnership Project (3GPP), Mobile Competence Centre, 650, Route Des Lucioles, F-06921, Sophia-Antipolis Cedex, France, vol. RAN WG2, No. 72bis Dublin, Ireland, Jan. 17-21, 2011, Jan. 11, 2011, 3 Pages.
Nokia Siemens Networks: "Remaining Issues for Improving Cell Detection", 3GPP Draft, R1-122405, 3rd Generation Partnership Project (3GPP), Mobile Competence Centre, 650, Route Des Lucioles, F-06921 Sophia-Antipolis Cedex,; France, vol. RAN WG1, No. 69 Meeting Prague, Czech, May 21-25, 2012, May 21, 2012, 3 Pages.
Renesas Mobile Europe Ltd: "On the Number of Physical Cell Identities in Small Cell Scenarios", 3GPP Draft, R1-133245, 3rd Generation Partnership Project (3GPP), Mobile Competence Centre, 650, Route Des Lucioles , F-06921 Sophia-Antipolis Cedex, France vol. RAN WG1, no. Meeting 74 Barcelona, Spain; Aug. 19-23, 2013, Aug. 19, 2013, 4 Pages, Retrieved from the Internet: URL:http://www.3gpp.org/ftp/tsg_ran/WG1_RL 1/TSGR1_74/Docs/.
Vodafone: "Minimising Service Interruption Time to Acquire Relevant System Information for Inbound Handover to CSG cells in LTE", 3GPP Draft, R2-092896, 3rd Generation Partnership Project (3GPP), Mobile Competence Centre ; 650 Route Des Lucioles, F-06921 Sophia-Antipolis Cedex,; France, vol. RAN WG2 No. 66 San Francisco, USA, May 4-8, 2009, May 4, 2009, 6 Pages.

* cited by examiner

METHODS AND APPARATUS FOR NETWORK ENTITY COLLISION DETECTION

CLAIM OF PRIORITY UNDER 35 U.S.C. §119

The present Application for Patent claims priority to Provisional Application No. 61/873,629 entitled "METHODS AND APPARATUS FOR ENHANCED NETWORK ENTITY COLLISION DETECTION" filed Sep. 4, 2013, and assigned to the assignee hereof and hereby expressly incorporated by reference herein.

BACKGROUND

Aspects of the present disclosure relate generally to wireless communication, and more particularly, to methods and apparatus for network entity collision detection.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some wireless communication networks, a user equipment (UE) selects and maintains a connection with a base station providing communication capabilities for the UE. Further, in such wireless communication systems, femto cells are deployed to improve wireless network communications when experiencing poor base station (e.g., Home Node B) connections. In such wireless communication networks, inefficient utilization of available communication resources, particularly identification resources for cell configurations, may lead to degradations in wireless communication. Even more, the foregoing inefficient resource utilization inhibits network devices from achieving higher wireless communication quality. In view of the foregoing, it may be understood that there may be significant problems and shortcoming associated with current collision detection technology. Thus, improvements in collision detection are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of communication at a network entity comprises receiving one or more technology layer measurements during a measurement period. The method further comprises determining that a first subset of the one or more technology layer measurements satisfies an adequate user equipment (UE) communication condition. In addition, the method comprises determining that a second subset of the one or more technology layer measurements satisfies at least one measurement threshold value. Moreover, the method comprises identifying a network entity conflict when the first subset of the one or more technology layer measurements satisfies the adequate UE communication condition and the second subset of the one or more technology layer measurements satisfies the at least one measurement threshold value.

In accordance with an aspect, a computer program product for communication comprising a computer-readable medium includes at least one instruction for causing a computer to receive one or more technology layer measurements during a measurement period. The computer-readable medium further includes at least one instruction for causing a computer to determine that a first subset of the one or more technology layer measurements satisfies an adequate user equipment (UE) communication condition. Moreover, the computer-readable medium includes at least one instruction for causing a computer to determine that a second subset of the one or more technology layer measurements satisfies at least one measurement threshold value. Additionally, computer-readable medium includes at least one instruction for causing a computer to identify a network entity conflict when the first subset of the one or more technology layer measurements satisfies the adequate UE communication condition and the second subset of the one or more technology layer measurements satisfies the at least one measurement threshold value.

In an additional aspect, an apparatus for communication comprises means for receiving one or more technology layer measurements during a measurement period. The apparatus further comprises means for determining that a first subset of the one or more technology-related layer measurements satisfies an adequate user equipment (UE) communication condition. Moreover, the apparatus comprises means for determining that a second subset of the one or more technology layer measurements satisfies at least one measurement threshold value. Additionally, the apparatus comprises means for identifying a network entity conflict when the first subset of the one or more technology layer measurements satisfies the adequate UE communication condition and the second subset of the one or more technology layer measurements satisfies the at least one measurement threshold value.

In a further aspect, an apparatus for communication comprises a memory storing executable instruction and a processor in communication with the memory, wherein the processor is configured to execute the instructions to receive one or more technology layer measurements during a measurement period. The processor is further configured to execute the instructions to determine that a first subset of the one or more technology layer measurements satisfies an adequate user equipment (UE) communication condition. Moreover, the processor is configured to execute the instructions to determine that a second subset of the one or more technology layer measurements satisfies at least one measurement threshold value. Additionally, the processor is configured to execute the instructions to identify a network entity conflict when the first subset of the one or more technology layer measurements satisfies the adequate UE communication condition and the second subset of the one or more technology layer measurements satisfies the at least one measurement threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
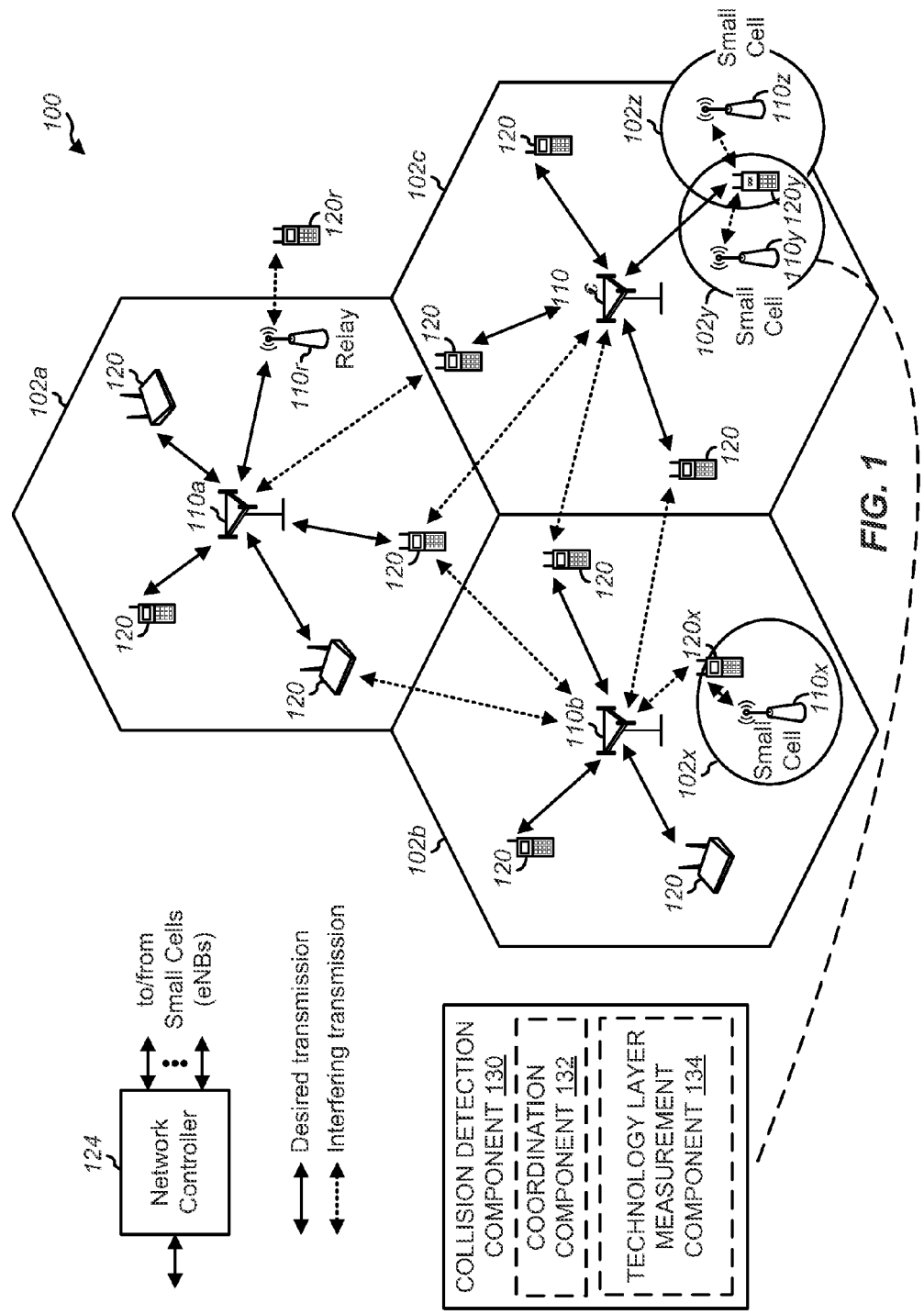
FIG. 1 is a block diagram conceptually illustrating an example of a telecommunications system in accordance with an aspect of the collision detection component.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

The present aspects generally relate to collision detection between network entities. Specifically, network entities such as small cells (e.g., pico cells, femto cells, etc.) may engage in various configuration procedures in order to facilitate communication with one or more UEs. Some configuration procedures may be autonomous, in that the small cell conducts various procedures without network operator initiation. In such scenarios, configuration by the small cell may include collision or conflict detection procedures for one or more network entity transmission-related parameters, such as physical cell identifiers (PCIs), for one or more supported radio access technology (RAT) entities.

However, in communication systems including a plurality of small cells, autonomous configurations such as parameter value selection for transmission-related parameters (e.g., PCI) may lead to collisions between two or more small cells. Such collisions may result in communication issues with both idle and connected UEs which receive, for example, similar signal strength from both the serving cell and the conflicting or colliding neighboring cell.

Accordingly, in some aspects, the present methods and apparatus may provide an efficient and effective solution, as compared to current solutions, to provide network entity transmission-related parameter collision detection at small cells. In an aspect, the present apparatus and methods include a coordinated UE and network entity measurement solution configured to detect a collision between two or more small cells by having the serving small cell suspend at least one configuration parameter (e.g., system information) transmission during a measurement period during which the UE has been instructed (e.g., by the serving small cell) to conduct frequency measurements in order to determine whether a configuration parameter of another (e.g., neighboring) small cell contains an identifier that would indicate a conflicting or colliding condition. In further collision detection aspects, the present apparatus and methods include a technology layer measurement solution, which may detect a collision between plural small cells based on one or more technology layer measurements.

FIG. 1 is a block diagram conceptually illustrating an example of a telecommunications network system 100 in accordance with an aspect of the present disclosure. Telecommunications network system 100 may include one or more network entities 110, for example, one or more small cells. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell.

For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

Each small cell 110 may include collision detection component 130, which may be configured to detect or otherwise determine a collision or conflict between at least two small cells. For example, collision detection component 130, which may be included in each small cell 110 illustrated in FIG. 1, may be configured to detect a colliding transmission-related parameter. In other words, collision detection component 130 may be configured to detect or otherwise determine a conflict or collision between two or more small cells communicating using an identical transmission-related parameter (e.g., PCI). Such collision detections may be accomplished by one or both of optional coordination component 132 and technology layer measurement component 134. In some aspects related to LTE, the network entity transmission-related parameter may be a physical cell identity (PCI) of the respective network entity.

For example, small cell 110y, which may include collision detection component 130, may optionally be configured to, via one or both of optional coordination component 132 and technology layer measurement component 134, to detect a collision with, for example, neighboring small cell 100z. In a non-limiting example, small cells may be referred to neighboring cells when they have overlapping coverage, which may allow a UE to have coverage from both cells at the same time. That is, UE 120y may observe the same transmission-related parameter (e.g., PCI) from both small cell 110y and small cell 110z. In such aspects, small cell 100y may be the serving small cell.

In an aspect, collision detection component 130 may optionally include coordination component 132, which may be configured to detect a collision or conflict between two or more small cells by configuring the serving small cell to suspend a transmission of at least one configuration parameter during a measurement period during which the UE may be instructed (e.g., by the serving small cell) to perform frequency measurements to provide the results of such frequency measurements to the serving small cell (e.g., small cell 110y) for collision determination.

For instance, collision detection component 130 may be configured to determine an identifier of another (neighboring) small cell based at least in part on the frequency measurements received from the UE (e.g., 120y). In such aspects, the serving small cell (e.g., small cell 110y) may determine that a collision or conflict with another small cell (e.g., small cell 110z) exists by comparing an identifier of another (e.g., neighboring) small cell to an identifier of the serving small cell (e.g., small cell 110y).

In another aspect, collision detection component 130 may optionally include technology layer measurement component 134, which may be configured to detect a collision between plural network entities by comparing one or more subsets of technology layer measurements to one or more conditions and/or thresholds. In other words, technology layer measurement component 134 may be configured to identify a conflict between serving small cell 110y and neighboring small cell 110z by utilizing measurements received from UE 120y. Specifically, technology layer measurement component 134 may be configured to determine whether a first subset of the technology layer measurements satisfies an adequate UE communication condition and whether a second subset of the measurements satisfies one or more measurement threshold values.

Figure 2:
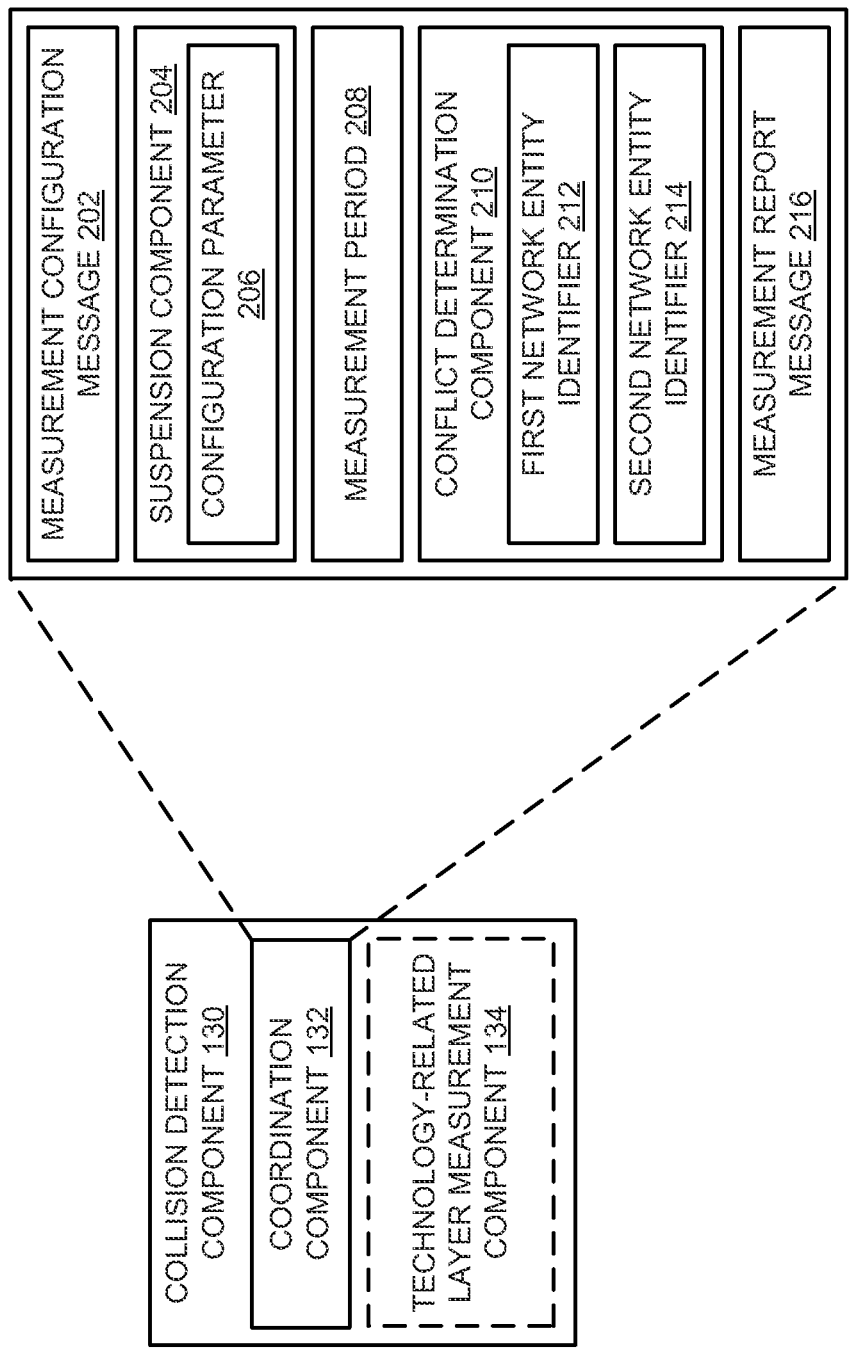
FIG. 2 is a schematic diagram of an aspect of the coordination component of FIG. 1.

Referring to FIG. 2, an aspect of coordination component 132 may include various components and/or subcomponents, which may be configured to determine a conflict or collision between a serving small cell and a neighboring small cell based at least in part on comparing an identifier of the serving small cell to the neighboring small cell. Specifically, in such aspects, coordination component 132 may be configured to send a measurement configuration message 202 to UE (e.g., UE 120y, FIG. 1) to configure the UE to perform one or more measurements during a measurement period 208. In such aspects, the one or more measurements may be one or more intra-frequency measurements.

In further aspects, coordination component 132 may include suspension component 204, which may be configured to suspend or otherwise prevent transmission of at least one configuration parameter to one or more UEs (e.g., UE 120y, FIG. 1) during the measurement period 208. In some aspects, the measurement period 208 may be any period specified in any unit of time or in accordance with the communication characteristics (e.g., subframe) of the respective technology (e.g., LTE) used to communicate between small cell (e.g., small cell 110y, FIG. 1) and a UE (e.g., UE 120y, FIG. 1). Additionally, the measurement period 208 may be configurable by the small cell (e.g., serving small cell 110y, FIG. 1).

Further, in such aspects, measurement configuration message 202 may include at least one instruction, or otherwise instruct the UE to determine a network entity identifier for a transmission-related parameter of the small cell during the measurement period 208. In some non-limiting cases, the network entity identifier may be an evolved universal terrestrial radio access network (E-UTRAN) cell global identifier (e.g., eCGI). In such aspects, an eCGI may be the globally unique identity of a cell in E-UTRA (LTE). In other words, the measurement configuration message 202 may configure the UE to conduct one or more frequency measurements in order to detect and/or determine the contents of at least one configuration parameter 206 received during the measurement period. However, suspension component 204 may be configured to suspend its transmission of the configuration parameter 206 during that period. As such, a detection of the configuration parameter 206 during the measurement period may be from another small cell (e.g., neighboring small cell 110z, FIG. 1).

Moreover, the configuration parameter 206 may be a system information block (SIB) of any sequential order. That is, in some non-limiting aspects, the configuration parameter may be SIB1. In such aspects, SIB1 may include information to assist UE (e.g., UE 120y, FIG. 1) in evaluating cell access and/or may also define the scheduling of other system information. In suspending or preventing transmission of at least one configuration parameter 206 (e.g., SIB1), coordination component 132 may determine whether another small cell (e.g., small cell 110z, FIG. 1) may be transmitting a similar transmission-related parameter (e.g., PCI) within overlapping communication coverage. For instance, coordination component 132 may further be configured to receive a measurement report message 216 from the UE (e.g., UE 120y, FIG. 1) after the measurement period 208. In particular, coordination component 132 may be configured to determine or otherwise detect, from the measurement report message 216, a collision with another small cell (e.g., small cell 110z, FIG. 1).

For instance, coordination component 132 may include, conflict determination component 210, which may be configured to determine a transmission-related parameter conflict between serving small cell (e.g., small cell 110y, FIG. 1) and a neighboring small cell (e.g., small cell 110z, FIG. 1) when the measurement report message 216 comprises a second network entity identifier 214 of the neighboring small cell different from a first network entity identifier 212 of the serving small cell. In other aspects, conflict determination component 210 may be configured to determine a transmission-related parameter conflict when the second network entity identifier 214 of the neighboring small cell, as determined by the UE based on identifying/detecting a neighboring small cell communicating using an identical transmission related parameter (PCI), is different from the first network entity identifier 212 of the serving small cell.

That is, in such aspects, conflict determination component 210 may be configured to determine, from the received measurement report message 216, that the UE detected a second network entity identifier 214 (e.g., $eCGI_2$) for the same transmission-related parameter (e.g., PCI) from at least one configuration parameter (e.g., SIB1) transmitted by neighboring small cell during the measurement period 208 different from a first network entity identifier 212 (e.g., $eCGI_1$) of the serving small cell. Further, the measurement report message 216 transmitted from the UE to serving small cell following the measurement period 208 may indicate reception of at least one configuration parameter (e.g., SIB1) from neighboring small cell. As such, a UE that includes collision detection component 130 may perform at least one conflict resolution procedure based at least in part on determining the transmission-related parameter conflict.

In some aspects, the one or more small cells may include, or communication according to at least one technology such as, but not limited to, long term evolution (LTE), universal mobile telecommunications system (UMTS), code division multiple access (CDMA) 2000, wireless local area network (WLAN) (e.g., WiFi). Further, the transmission-related parameters associated with each of the one or more network entities, such as the foregoing non-limiting example network entities may include, but are not limited to, physical cell identity (PCI), primary synchronization code (PSC), pseudo-random noise code (PN), channel numbers and/or beacon patterns.

For example, in aspects related to UMTS, conflict determination component 210 may be configured to compare network entity identifiers in the form of cell global identifiers (CGIs) for each two or more network entities. Specifically, conflict determination component 210 may be configured to determine, from the received measurement report message 216, that the UE detected a second network entity identifier 214 (e.g., $CGI_2$) for the same transmission-related parameter (e.g., PSC) from at least one configuration parameter (e.g., any one of SIB1) transmitted by neighboring small cell during the measurement period 208 different from a first network entity identifier 212 (e.g., $CGI_1$) of the serving small cell.

Figure 3:
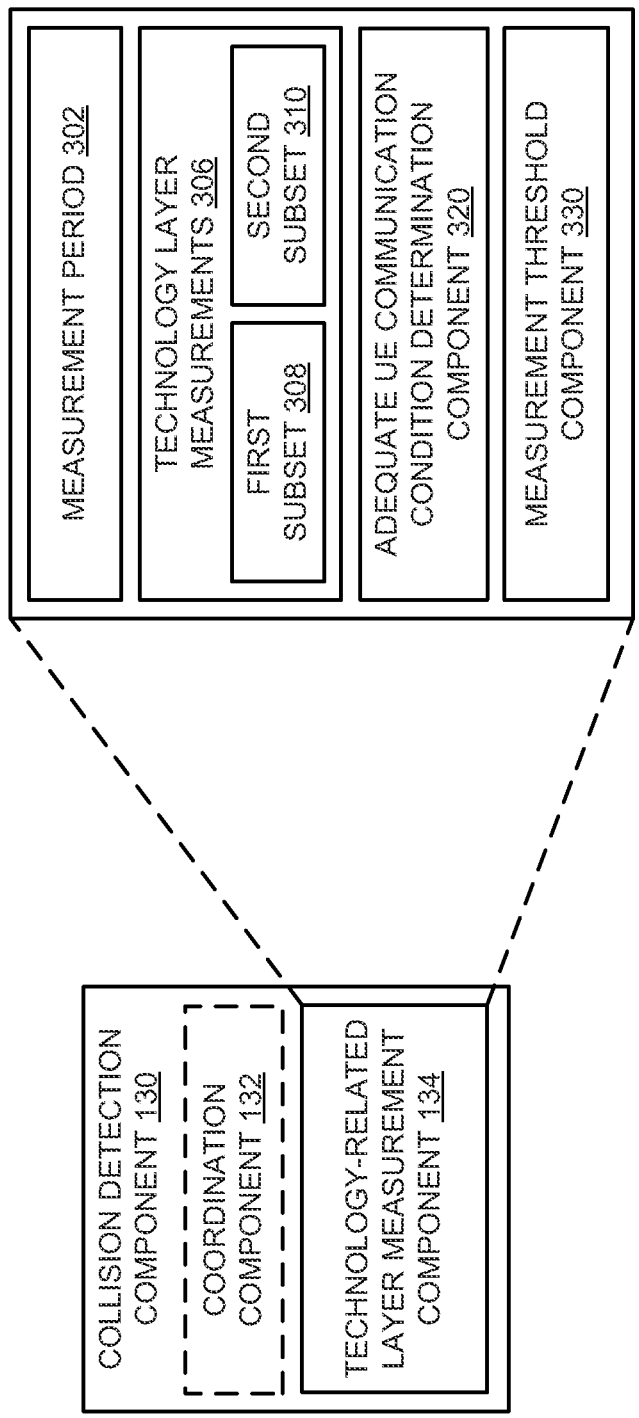
FIG. 3 is a schematic diagram of an aspect of the technology layer measurement component of FIG. 1.

Referring to FIG. 3, an aspect of technology layer measurement component 134 may include various components and/or subcomponents, which may be configured to determine a conflict or collision between a serving small cell and a neighboring small cell based at least in part on performing one or more procedures that rely at least partially on various technology layer measurements. Specifically, for instance, technology layer measurement component 134 may be configured to receive one or more technology layer measurements 306 during a measurement period 302.

In such aspects, the measurement period 302 may be configurable by the small cell, or more specifically, technology layer measurement component 134. Additionally, the technology layer measurements 306 may be physical layer (e.g., layer 1) measurements, which may include, but are not limited to, reference signal receive power (RSRP) indication, a reference signal receive quality (RSRQ) indication, a channel quality indicator (CQI) indication, a block error rate (BLER) indication, an acknowledgment (ACK) or negative acknowledgment (NACK) indication and a CQI backoff, and a metric value derived from one or more of the RSRP, RSRQ, CQI, BLER, ACK, NACK, and CQI backoff.

Based on at least the foregoing measurements received by technology layer measurement component 134, technology layer measurement component 134 may determine that another small cell, such as small cell 110z in FIG. 1, may be transmitting the same transmission-related parameter as serving small cell (e.g., small cell 110y, FIG. 1). Hence, the measurements provided by the UE (e.g., UE 120y) may demonstrate poor communication conditions resulting from a collision between serving small cell (e.g., small cell 110y, FIG. 1) and neighboring small cell (e.g., small cell 110z, FIG. 1).

Further, technology layer measurement component 134 may include adequate UE communication condition determination component 320, which may be configured to determine that a first subset 308 of the one or more technology layer measurements 306 satisfies an adequate UE communication condition. For example, adequate UE communication condition determination component 320 may be configured to perform at least one arithmetic operation on the first subset 308 of the one or more technology layer measurements 306. In some aspects, the arithmetic operation provides an adjusted first subset of the one or more technology layer measurements.

In addition, adequate UE communication condition determination component 320 may be configured to perform one or more arithmetic operations on the first subset 308 by, for example, obtaining an average value of the first subset 308 of the one or more technology layer measurements 306. In such non-limiting aspects, the first subset may include any one or more of the RSRP, RSRQ and/or CQI. Further, such determination based on the first subset 308 of technology layer measurements 306 may be an indication of whether the UE is experiencing or operating in an adequate or acceptable radio quality state/condition.

In order to make such adequate or acceptable radio quality state or condition, adequate UE communication condition determination component 320 may, for instance, compare the adjusted (e.g., average value) first subset of the one or more technology layer measurements 306 to one or more corresponding measurement threshold value (e.g., corresponding to the respective measurement). As such, if based on the comparison the adjusted first subset of the one or more technology layer measurements 306 are greater than the corresponding measurement thresholds, then technology layer measurement component 134 may determine that the UE is experiencing or operating in an adequate or acceptable radio quality state/condition. Otherwise, if the condition is not adequate, technology layer measurement component 134 may determine that the poor communication conditions may not be result of a potential conflict or collision with another small cell.

Technology layer measurement component 134 may then be configured to determine whether a second subset of the one or more technology layer measurements 306 satisfies at least one measurement threshold value. For example, technology layer measurement component 134 may include measurement threshold component 330, which may be configured to compare a second subset 310 of the one or more technology layer measurements 306 to the at least one measurement threshold value. In such aspects, the second subset 310 of the one or more technology layer measurements 306 may include, but are not limited to the BLER, a number of ACKs or non-acknowledgment NACKs and CQI backoff. Further, the foregoing measurements may be used to independently determine network entity collisions.

In particular, measurement threshold component 330 may be configured to determine that the second subset 310 of the one or more technology layer measurements 306 satisfies at least one measurement threshold by performing an arithmetic operation on the second subset 310 to obtain an adjusted second subset of the one or more technology layer measurements 306. Specifically, for example, measurement threshold component 330 may be configured to obtain an average value of a first measurement (e.g., BLER) within the second subset 310 based on one or more both of a number of second measurements (e.g., ACKs) and a number of third measurements (e.g., NACKs).

For instance, measurement threshold component 330 may be configured to compare an adjusted second subset (e.g., averaged BLER) to a corresponding measurement threshold value. In other aspects, measurement threshold component 330 may be configured to determine whether a total number of NACKs received over the configurable measurement period 302 exceeds a corresponding measurement threshold value. It should be understood that technology layer measurement component 134 may perform one or both determinations according to the adequate UE communication condition determination component 320 and measurement threshold component 330 in order to determine whether a collision exists with another network entity.

As such, technology layer measurement component 134 may be configured to identify a conflict between a serving small cell and a neighboring small cell when the first subset 308 of the one or more technology layer measurements 306 satisfies the adequate UE communication condition and the second subset 310 of the one or more technology layer measurements 306 satisfies the at least one measurements threshold value.

Technology layer measurement component 134 may be configured to provide indication to one or more component and/or subcomponents of small cell (e.g., small cell 110y) to perform at least one transmission-related parameter resolution procedure when the first subset of the one or more technology-related layer measurements satisfies the adequate UE communication condition and the second subset of the one or more technology-related layer measurements satisfies the at least one measurement threshold.

Moreover, for example, the telecommunications network system 100 (FIG. 1) may be an LTE network or some other similar Wide Wireless Area Network or WWAN. In such LTE aspects, the telecommunications network system 100 may include a number of eNodeBs 110, each of which may include collision detection component 130, user equipment (UEs) 120 and other network entities. An eNodeB 110 for a macro cell may be referred to as a macro eNodeB. An eNodeB 110 for a small cell may be referred to as a small eNodeB. In the example shown in FIG. 1, the eNodeBs 110a, 110b and 110c may be macro eNodeBs for the macro cells 102a, 102b and 102c, respectively. The eNodeB 110x, 110y and 110z may be a small eNodeB for a small cells 102x, 102y and 102z. An eNodeB 110 may provide communication coverage for one or more (e.g., three) cells.

It should be understood that each of the eNodeBs may include collision detection component 130. In some aspects, the telecommunications network system 100 (FIG. 1) may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications network system 100 (FIG. 1) may be a heterogeneous network that includes eNodeBs 110 of different types, e.g., macro eNodeBs 110a-c, pico eNodeBs 110x, femto eNodeBs 110y-z, relays 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 124 may be coupled to a set of eNodeBs 110 and provide coordination and control for these eNodeBs 110. The network controller 124 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 4:
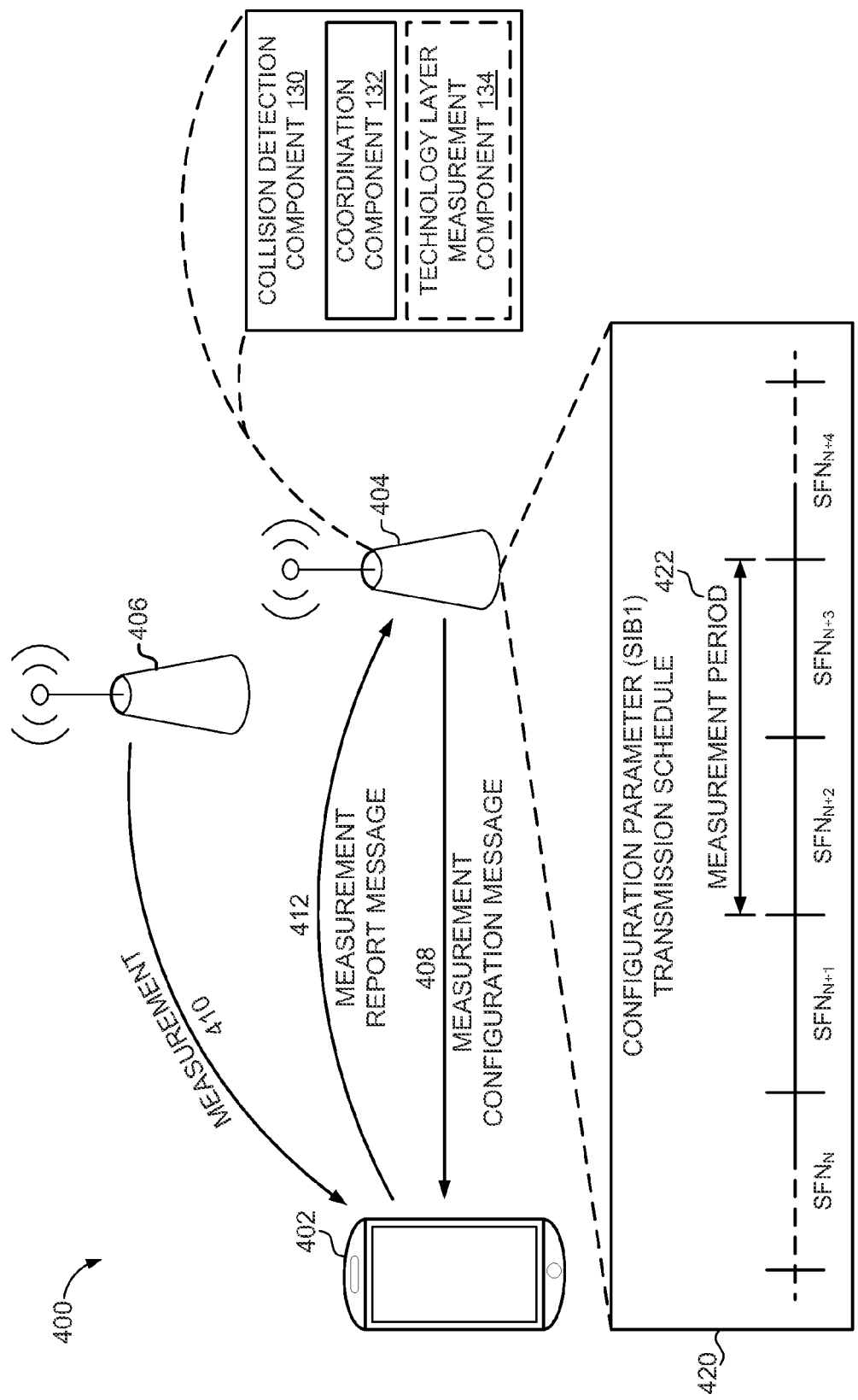
FIG. 4 is a conceptual diagram of an aspect of a communication scheme according to the aspects of the coordination component described herein.

Referring to FIG. 4, a conceptual diagram of an aspect of a communication scheme 400 according to the aspects of the coordination component 132 is illustrated. UE 402 may communicate with serving small cell 404, which may include collision detection component 130. In some aspects, serving small cell 404 may be the same as or similar to small cell 110y in FIG. 1. Additionally, UE 402 may be in communication coverage of neighboring small cell 406. As such, in some aspects, serving small cell 404 and neighboring small cell 406 may communicate according to the same transmission-related parameter.

In the aspects of FIG. 4, serving small cell 404 may send a measurement configuration message 408 to UE 402 to configure UE 402 to perform one or more measurements during measurement period 422. In some aspects, serving small cell 404 may send the measurement configuration message periodically to determine conflict scenarios. Upon receiving the measurement configuration message 408, UE 402 may conduct or perform one or more measurements to determine a network entity identifier (e.g., eCGI) of the neighboring small cell. At the same time, serving small cell 404 may suspend the transmission of its configuration parameter for the measurement period 422.

Specifically, according to the configuration parameter transmission schedule 420, serving small cell may suspend its configuration parameter transmission at substantially the same time as UE 402 performs or otherwise receives one or more frequency measurements 410. Following the measurement period 422, UE may provide a measurement report message 412 to serving small cell 404. Serving small cell 404 may determine a transmission-related parameter conflict or collision by comparing the network entity identifier (e.g., eCGI) of the neighboring small cell 406 included in the measurement report message 412, to its own network entity identifier. When the network entity identifier of the neighboring small cell is different from the network entity identifier of the serving small cell 404, a conflict or collision may be declared by the serving small cell 404.

Figure 5:
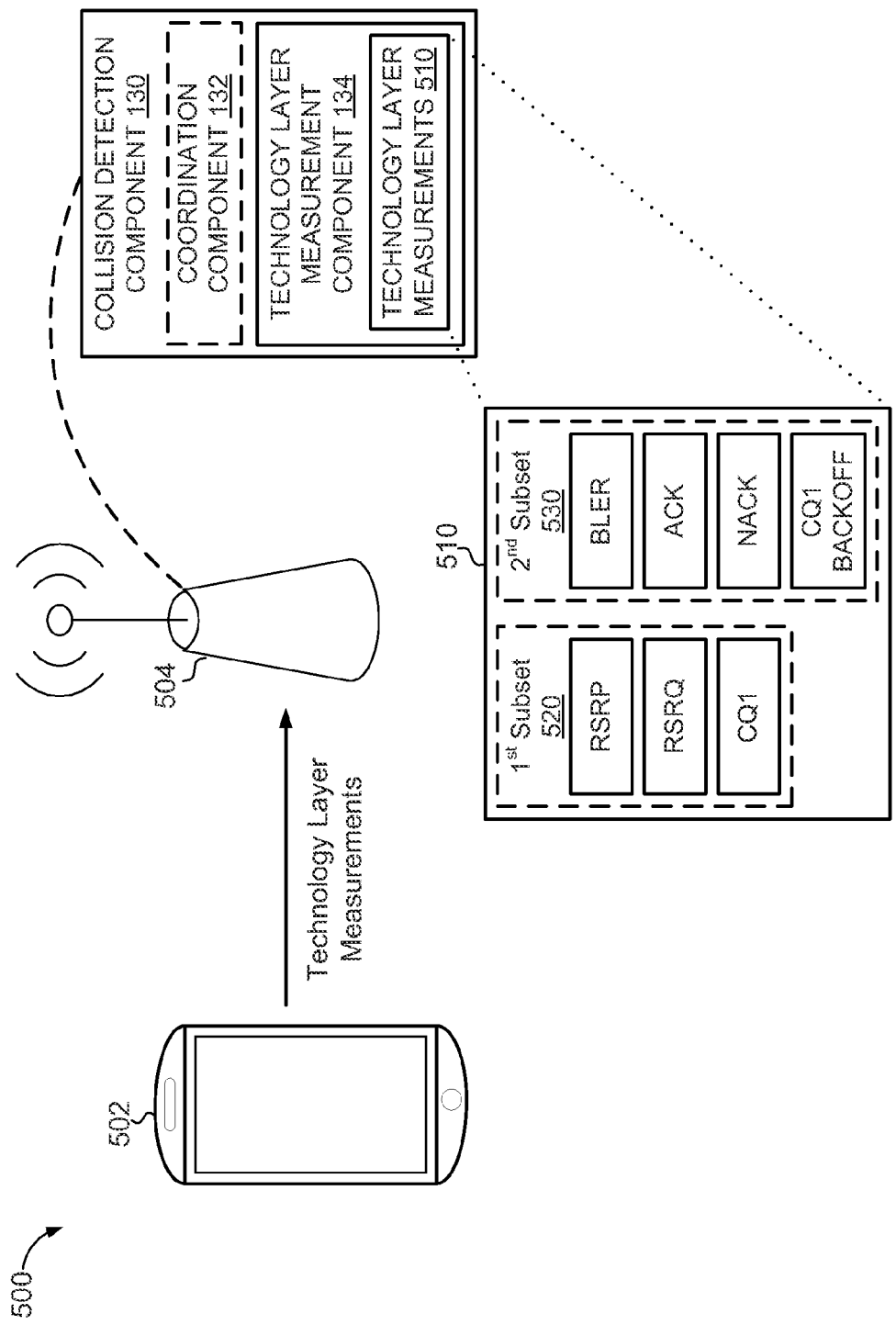
FIG. 5 is a conceptual diagram of an aspect of a communication scheme according to the aspects of the technology layer measurement component described herein.

Referring to FIG. 5, a conceptual diagram of an aspect of a communication scheme 500 according to the aspects of the technology layer measurement component described herein is illustrated. UE 502 may communicate with serving small cell 504, which may include collision detection component 130. In some aspects, serving small cell 504 may be the same as or similar to small cell 110y in FIG. 1.

In the aspects of FIG. 5, serving small cell 504 may receive one or more technology layer measurements 510 from UE 502 during a measurement period. Specifically, technology layer measurement component 134 may be configured to determine or otherwise detect a conflict between serving small cell 504 and a neighboring small cell (not shown) by comparing one or more subsets of the technology layer measurements.

For example, serving small cell 504 may, via technology layer measurement component 134, receive and store technology layer measurements 510. In particular, technology layer measurements 510 may include a first subset 520 which may include RSRP, RSRQ and/or CQI measurements. Additionally, technology layer measurements 510 may include a second subset 530 which may include BLER, ACK, NACK and CQI backoff measurements. As such, serving small cell 504 may identify a network entity conflict when the first subset 520 of the one or more technology layer measurements satisfies the adequate UE communication condition and the second subset 530 of the one or more technology layer measurements satisfies the at least one measurement threshold value.

Figure 6:
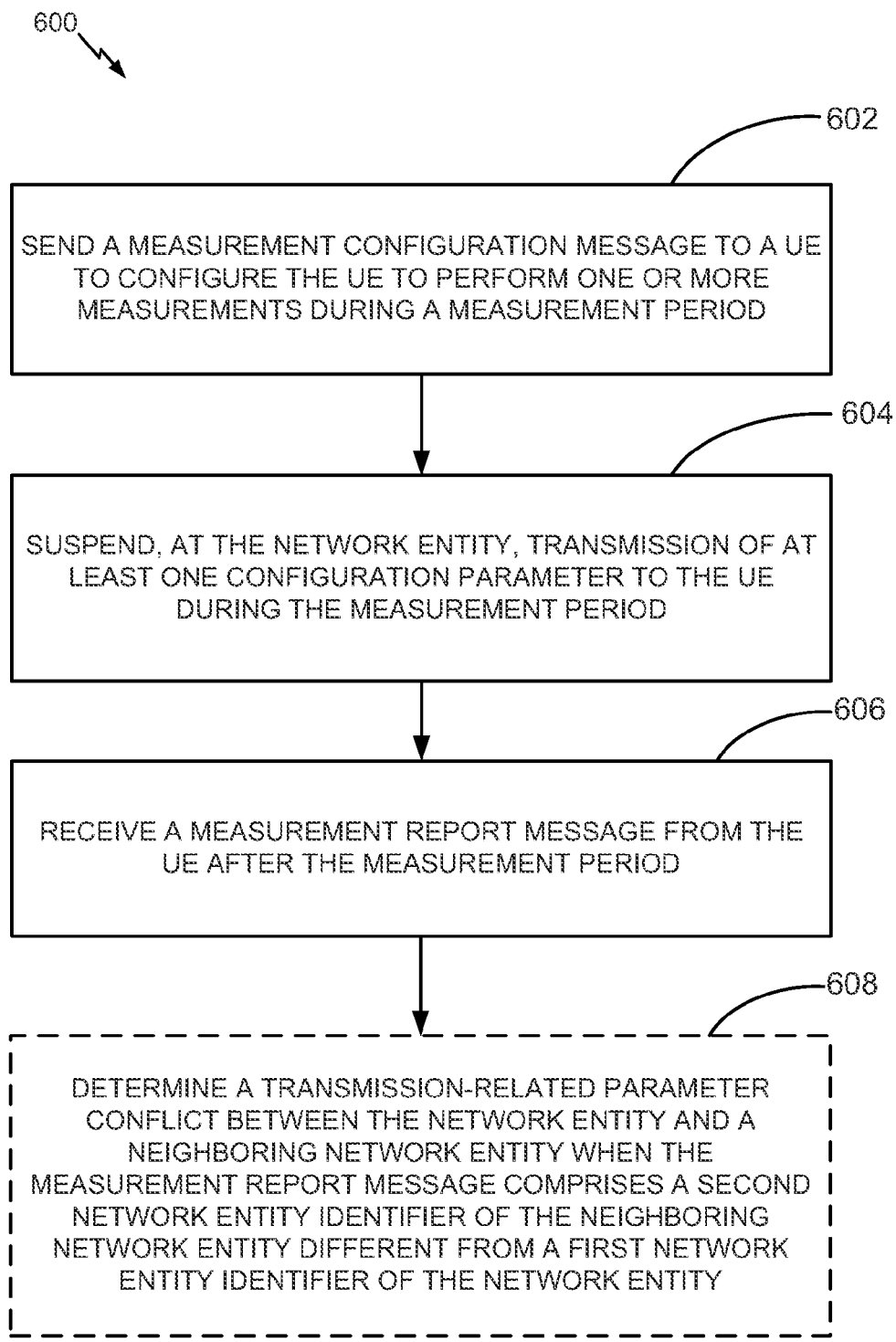
FIG. 6 is a flow diagram illustrating a method of wireless communication at a network entity, e.g., according to the coordination component of FIG. 1.
Figure 7:
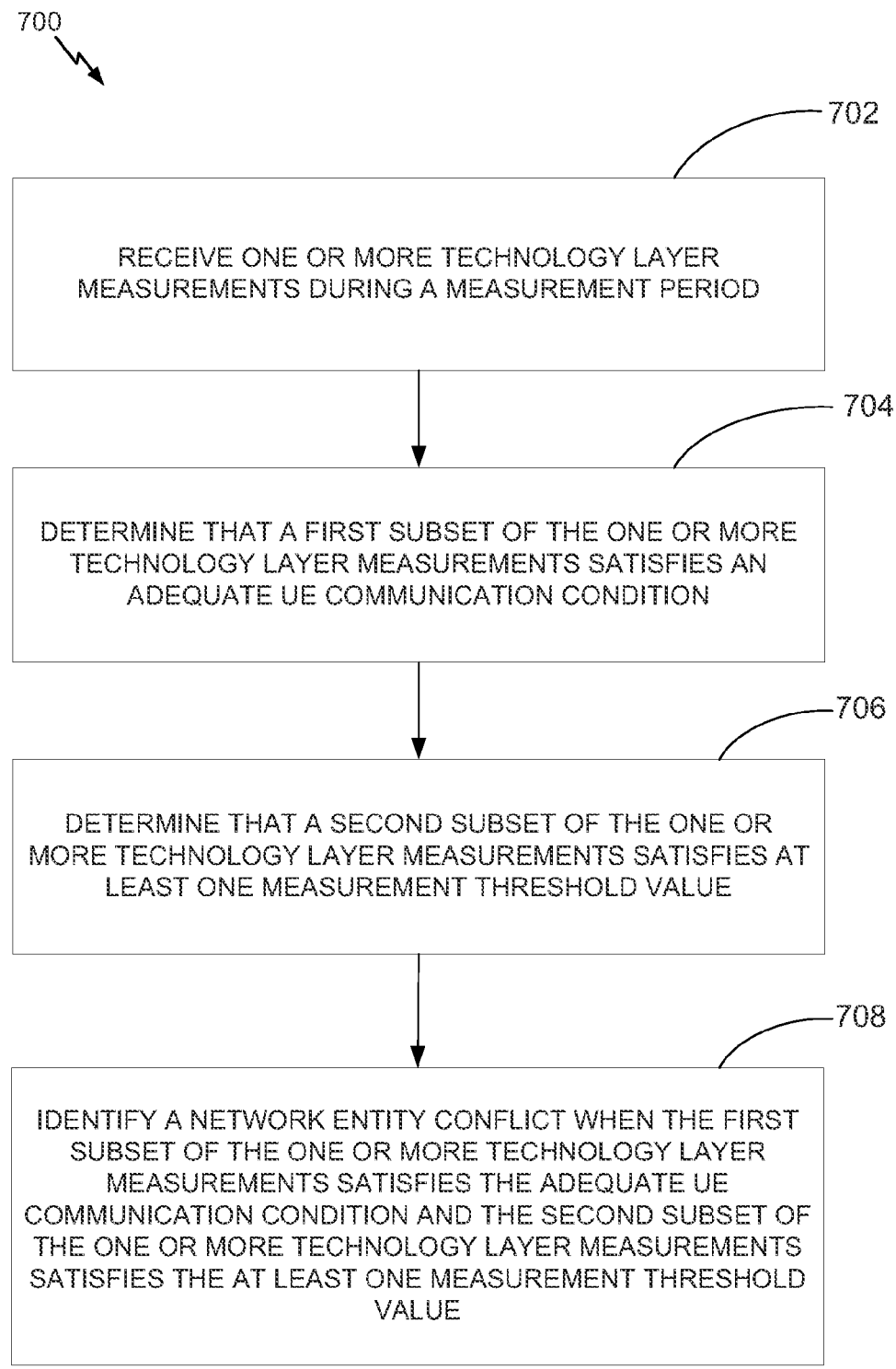
FIG. 7 is a flow diagram illustrating a method of wireless communication at a network entity, e.g., according to technology-related layer measurement component of FIG. 1.

Referring to FIGS. 6 and 7, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 6, in an operational aspect, a network entity such as small cell 110y (FIG. 1) may perform one aspect of a method 600 for detecting collisions according to the coordination component 132 (FIGS. 1 and 2). In an aspect, at block 602, method 600 may send a measurement configuration message to a UE to configure the UE to perform one or more measurements during a measurement period. For example, as described herein, collision detection component 130 (FIGS. 1 and 2) may execute coordination component 132 (FIGS. 1 and 2) to send measurement configuration message 202 (FIG. 2) to UE 120y (FIG. 1) to configure UE 120y to perform one or more measurements during a measurement period 208 (FIG. 2).

Further, at block 604, method 600 may suspend, at the network entity, transmission of at least one configuration parameter to the UE during the measurement period. For instance, as described herein, coordination component 132 (FIGS. 1 and 2) may execute suspension component 204 (FIG. 2) to suspend transmission of at least one configuration parameter 206 (FIG. 2) to UE 120y (FIG. 1) during the measurement period 208 (FIG. 2). In some aspects, the network entity may be the serving network entity (e.g., small cell 110y, FIG. 1).

Moreover, at block 606, method 600 may receive a measurement report message from the UE after the measurement period. For example, as described herein, collision detection component 130 (FIGS. 1 and 2) may execute coordination component 132 (FIGS. 1 and 2) to receive a measurement report message 216 (FIG. 2) from UE 120y (FIG. 1) after the measurement period 208 (FIG. 2).

In addition, at block 608, method 600 may optionally determine a transmission-related parameter conflict between the network entity and a neighboring network entity when the measurement report message comprises a second network entity identifier of the neighboring network entity different from a first network entity identifier of the network entity. For instance, as described herein, coordination component (FIGS. 1 and 2) may execute conflict determination component 210 (FIG. 2) to determine a transmission-related parameter conflict between the network entity (e.g., small cell 110y, FIG. 1) and a neighboring network entity (e.g., small cell 110z, FIG. 1) when the measurement report message 216 (FIG. 2) comprises a second network entity identifier 214 (FIG. 2) of the neighboring network entity different from a first network entity identifier 212 (FIG. 2) of the network entity.

Referring to FIG. 7, in an operational aspect, a network entity such as small cell 110y (FIG. 1) may perform one aspect of a method 700 for detecting collisions according to the technology layer measurement component 134 (FIGS. 1 and 2).

In an aspect, at block 702, method 700 may receive one or more technology layer measurements during a measurement period. For example, as described herein, collision detection component 130 (FIGS. 1 and 3) may execute technology layer measurement component 134 (FIGS. 1 and 3) to receive one or more technology layer measurements 306 (FIG. 3) during measurement period 302 (FIG. 3).

Further, at block 704, method 700 may determine that a first subset of the one or more technology layer measurements satisfies an adequate UE communication condition. For instance, as described herein, technology layer measurement component 134 (FIGS. 1 and 3) may execute adequate UE communication condition determination component 320 (FIG. 3) to determine that first subset 308 (FIG. 3) of the one or more technology layer measurements 306 (FIG. 3) satisfies an adequate UE communication condition.

Moreover, at block 706, method 700 may determine that a second subset of the one or more technology layer measurements satisfies at least one measurement threshold value. For example, as described herein, technology layer measurement component 134 (FIGS. 1 and 3) may execute measurement threshold component 330 (FIG. 3) to determine that second subset 310 (FIG. 3) of the one or more technology layer measurements 306 (FIG. 3) satisfies at least one measurement threshold value.

In addition, at block 708, method 700 may identify a network entity conflict when the first subset of the one or more technology layer measurements satisfies the adequate UE communication condition and the second subset of the one or more technology layer measurements satisfies the at least one measurement threshold value. For example, as described herein, collision detection component 130 (FIGS. 1 and 3) may execute technology layer measurement component 134 (FIGS. 1 and 3) to identify a network entity conflict when the first subset 308 (FIG. 3) of the one or more technology layer measurements 306 (FIG. 3) satisfies the adequate UE communication condition and the second subset 310 (FIG. 3) of the one or more technology layer measurements satisfies the at least one measurement threshold value.

Figure 8:
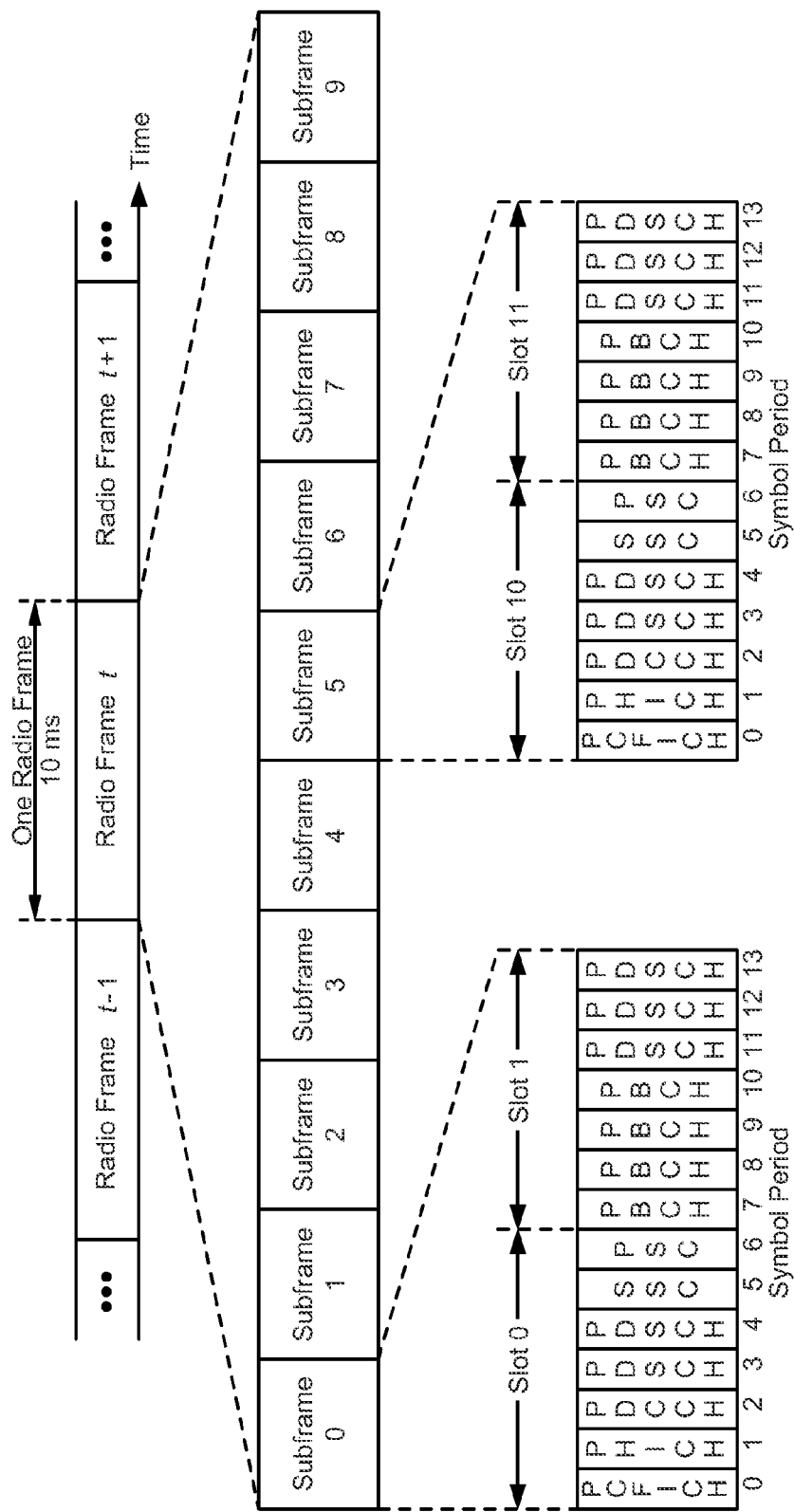
FIG. 8 is a block diagram conceptually illustrating an example of a downlink frame structure in a telecommunications system in accordance with an aspect of the present disclosure, e.g., according to FIG. 1.

FIG. 8 is a block diagram conceptually illustrating an example of a down link frame structure in a telecommunications system in accordance with an aspect of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 8) or 14 symbol periods for an extended cyclic prefix (not shown). The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 8. The synchronization signals may be used by UEs for cell detection and acquisition. The eNodeB may send system information in a Physical Broadcast Channel (PBCH) in symbol periods 0 to 3 of slot 1 of sub-frame 0.

The eNodeB may send information in a Physical Control Format Indicator Channel (PCFICH) in only a portion of the first symbol period of each sub-frame, although depicted in the entire first symbol period in FIG. 8. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send information in a Physical HARQ Indicator Channel (PHICH) and a Physical Downlink Control Channel (PDCCH) in the first M symbol periods of each sub-frame (M=3). The PHICH may carry information to support hybrid automatic retransmission (HARQ). The PDCCH may carry information on uplink and downlink resource allocation for UEs and power control information for uplink channels. Although not shown in the first symbol period in FIG. 2, it may be understood that the PDCCH and PHICH are also included in the first symbol period.

Similarly, the PHICH and PDCCH are also both in the second and third symbol periods, although not shown that way in FIG. 8. The eNodeB may send information in a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

Figure 9:
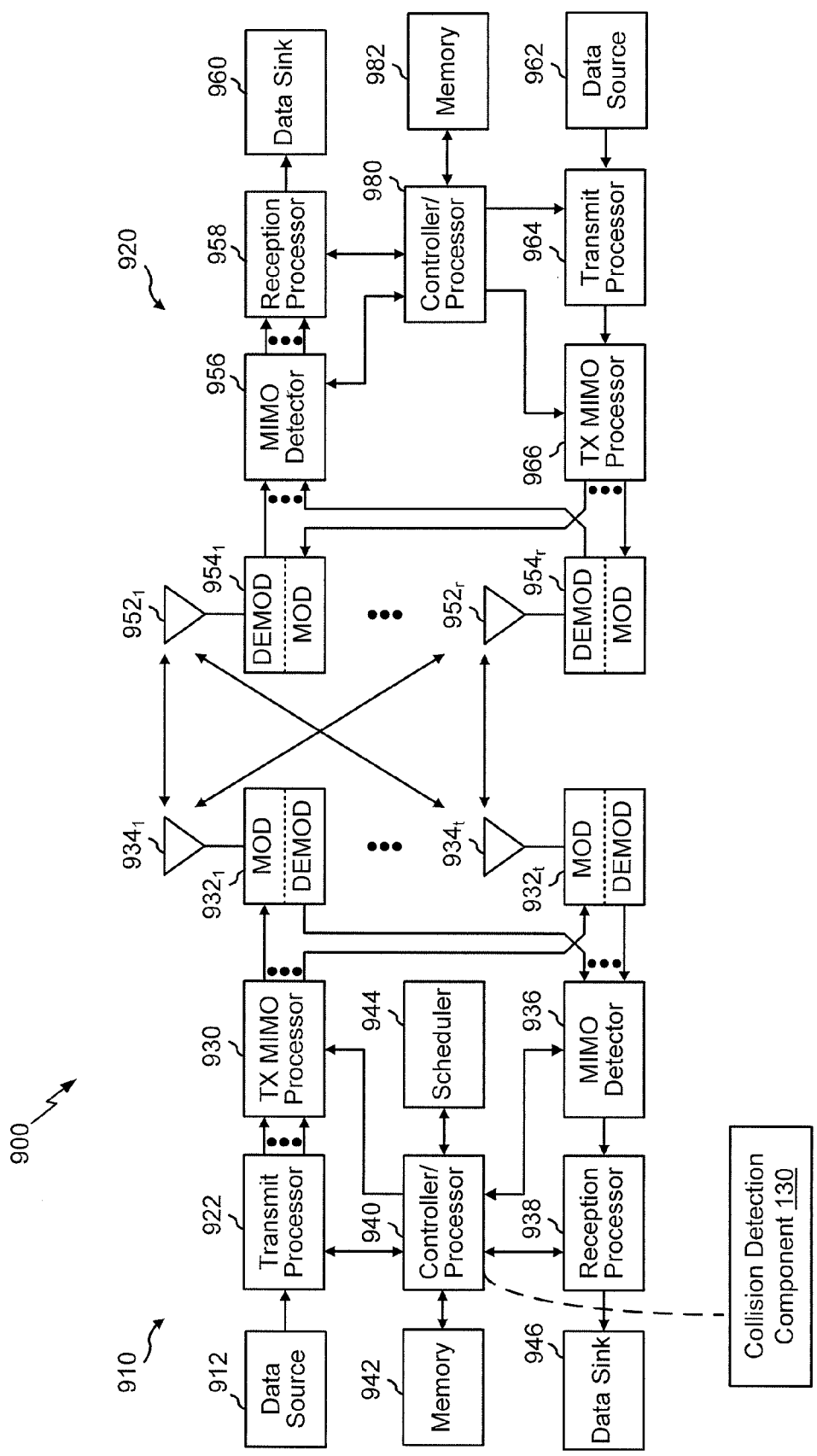
FIG. 9 is a block diagram conceptually illustrating an exemplary eNodeB and an exemplary UE configured in accordance with an aspect of the present disclosure, e.g., according to FIG. 1.

FIG. 9 is a block diagram conceptually illustrating an exemplary eNodeB 910 and an exemplary UE 920 configured in accordance with an aspect of the present disclosure. For example, the base station/eNodeB 910 and the UE 920, as shown in FIG. 3, may be one of the base stations/eNodeBs and one of the UEs in FIG. 1, including the small cell 110$y$ including collision detection component 130. The base station 910 may be equipped with antennas 934$_{l\text{-}t}$, and the UE 920 may be equipped with antennas 952$_{l\text{-}r}$, wherein t and r are integers greater than or equal to one.

At the base station 910, a base station transmit processor 922 may receive data from a base station data source 912 and control information from a base station controller/processor 940. The control information may be carried on the PBCH, PCFICH, PHICH, PDCCH, etc. The data may be carried on the PDSCH, etc. The base station transmit processor 922 may process (e.g., encode and symbol map) the data and control information to obtain data symbols and control symbols, respectively. The base station transmit processor 922 may also generate reference symbols, e.g., for the PSS, SSS, and cell-specific reference signal (RS). A base station transmit (TX) multiple-input multiple-output (MIMO) processor 930 may perform spatial processing (e.g., precoding) on the data symbols, the control symbols, and/or the reference symbols, if applicable, and may provide output symbol streams to the base station modulators/demodulators (MODs/DEMODs) 932$_{l\text{-}t}$. Each base station modulator/demodulator 932 may process a respective output symbol stream (e.g., for OFDM, etc.) to obtain an output sample stream. Each base station modulator/demodulator 932 may further process (e.g., convert to analog, amplify, filter, and upconvert) the output sample stream to obtain a downlink signal. Downlink signals from modulators/demodulators 932$_{l\text{-}t}$ may be transmitted via the antennas 934$_{l\text{-}t}$, respectively.

At the UE 920, the UE antennas 952$_{l\text{-}r}$ may receive the downlink signals from the base station 910 and may provide received signals to the UE modulators/demodulators (MODs/DEMODs) 954$_{l\text{-}r}$, respectively. Each UE modulator/demodulator 954 may condition (e.g., filter, amplify, downconvert, and digitize) a respective received signal to obtain input samples. Each UE modulator/demodulator 954 may further process the input samples (e.g., for OFDM, etc.) to obtain received symbols. A UE MIMO detector 956 may obtain received symbols from all the UE modulators/demodulators 954$_{l\text{-}r}$, and perform MIMO detection on the received symbols if applicable, and provide detected symbols. A UE reception processor 958 may process (e.g., demodulate, deinterleave, and decode) the detected symbols, provide decoded data for the UE 920 to a UE data sink 960, and provide decoded control information to a UE controller/processor 980.

On the uplink, at the UE 920, a UE transmit processor 964 may receive and process data (e.g., for the PUSCH) from a UE data source 962 and control information (e.g., for the PUCCH) from the UE controller/processor 980. The UE transmit processor 964 may also generate reference symbols for a reference signal. The symbols from the UE transmit processor 964 may be precoded by a UE TX MIMO processor 966 if applicable, further processed by the UE modulator/demodulators 954$_{l\text{-}r}$ (e.g., for SC-FDM, etc.), and transmitted to the base station 910. At the base station 910, the uplink signals from the UE 920 may be received by the base station antennas 934, processed by the base station modulators/demodulators 932, detected by a base station MIMO detector 936 if applicable, and further processed by a base station reception processor 938 to obtain decoded data and control information sent by the UE 920. The base station reception processor 938 may provide the decoded data to a base station data sink 946 and the decoded control information to the base station controller/processor 940.

The base station controller/processor 940 and the UE controller/processor 980 may direct the operation at the base station 910 and the UE 920, respectively. The base station controller/processor 940 and/or other processors and modules at the base station 910 may perform or direct, e.g., the execution of various processes for the techniques described herein. The UE controller/processor 980 and/or other processors and modules at the UE 920 may also perform or direct, e.g., the execution of the functional blocks illustrated in FIGS. 6 and 7 and/or other processes for the techniques described herein. The base station memory 942 and the UE memory 982 may store data and program codes for the base station 910 and the UE 920, respectively. A scheduler 944 may schedule UEs 920 for data transmission on the downlink and/or uplink.

In one configuration, the base station 910 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 940, the base station memory 942, the base station transmit processor 922, the base station modulators/demodulators 932, and the base station antennas 934 configured to perform the functions recited by the aforementioned means. In another aspect, the aforementioned means may be a module or any apparatus configured to perform the functions recited by the aforementioned means.

In one configuration, the UE 920 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 980, the UE memory 982, the UE reception processor 958, the UE MIMO detector 956, the UE modulators/demodulators 954, and the UE antennas 952 configured to perform the functions recited by the aforementioned means. In another aspect, the aforementioned means may be a module or any apparatus configured to perform the functions recited by the aforementioned means.

Figure 10:
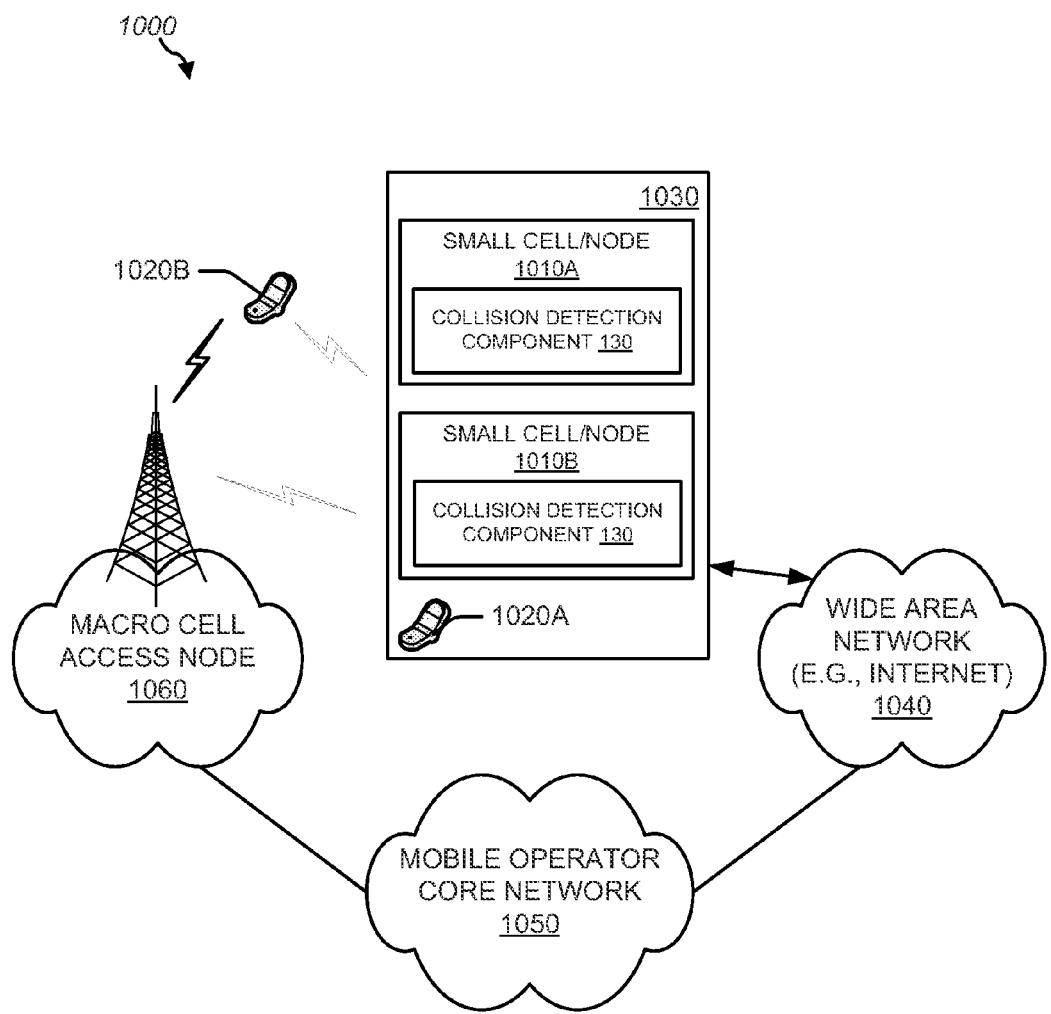
FIG. 10 illustrates an example communication system to enable deployment of small cells/nodes within a network environment including an aspect of the collision detection component described herein.

FIG. 10 illustrates an example communication system 1000 where one or more small cells are deployed within a network environment. Specifically, the system 1000 includes multiple small cells 1010 (e.g., small cells or HNB 1010A and 1010B) installed in a relatively small scale network environment (e.g., in one or more user residences 1030), wherein the small cells 1010 may be the same as or similar to small cell 110y (FIG. 1) including collision detection component 130 (FIG. 1). Each small cell 1010 may be coupled to a wide area network 1040 (e.g., the Internet) and a mobile operator core network 1050 via a DSL router, a cable modem, a wireless link, or other connectivity means (not shown).

As described herein, each small cell 1010 may be configured to serve associated access terminals 1020 (e.g., access terminal 1020A) and, optionally, alien access terminals 1020 (e.g., access terminal 1020B), both of which may be the same as or similar to UEs 120 (FIG. 1). In other words, access to small cells 1010 may be restricted whereby a given access terminal 1020 may be served by a set of designated (e.g., home) small cell(s) 1010 but may or may not be served by any non-designated small cells 1010 (e.g., a neighboring small cell).

Figure 11:
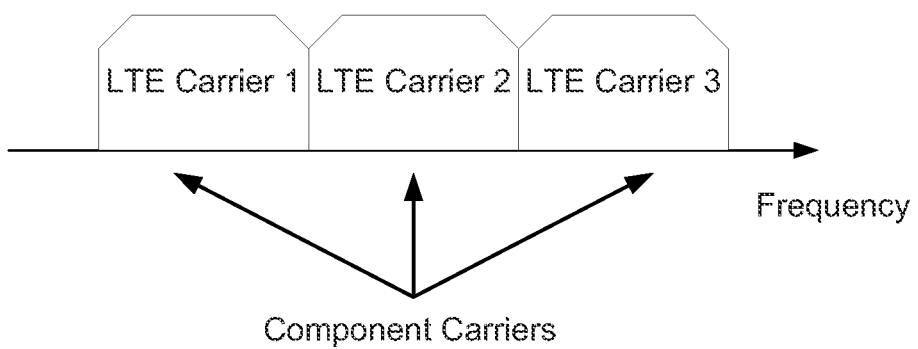
FIG. 11 illustrates an aspect of a continuous carrier aggregation type in accordance with an aspect of the present disclosure, e.g., according to FIG. 1.
Figure 12:
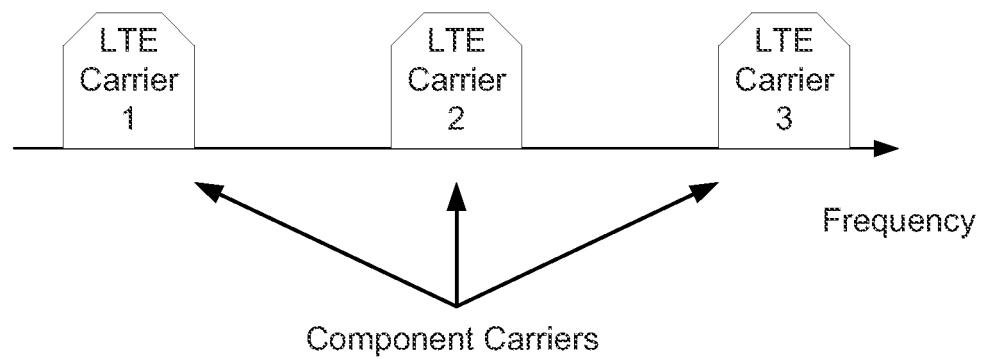
FIG. 12 illustrates an aspect of a non-continuous carrier aggregation type in accordance with an aspect of the present disclosure, e.g., according to FIG. 1.

UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 11 and 12, respectively. Continuous CA occurs when multiple available component carriers are adjacent to each other (as illustrated in FIG. 11). On the other hand, non-continuous CA occurs when multiple non-adjacent available component carriers are separated along the frequency band (as illustrated in FIG. 11). It should be understood that any one or more small cells (e.g., network entities), including small cell 110y, illustrated in FIG. 1 may communicate or facilitate communication according to the aspects set forth with regard to FIGS. 11 and 12.

Both non-continuous and continuous CA may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

LTE-A standardization may require carriers to be backward-compatible, to enable a smooth transition to new releases. However, backward-compatibility may require the carriers to continuously transmit common reference signals (CRS), also may be referred to as (cell-specific reference signals) in every subframe across the bandwidth. Most cell site energy consumption may be caused by the power amplifier since the cell remains on even when only limited control signalling is being transmitted, causing the amplifier to continuously consume energy. CRS were introduced in release 8 of LTE standard and may be referred to as LTE's most basic downlink reference signal. For example, CRS may be transmitted in every resource block in the frequency domain and in every downlink subframe. CRS in a cell can be for one, two, or four corresponding antenna ports. CRS may be used by remote terminals to estimate channels for coherent demodulation. A new carrier type may allow temporarily switching off of cells by removing transmission of CRS in four out of five subframes. This reduces power consumed by the power amplifier. It also may reduce the overhead and interference from CRS since the CRS won't be continuously transmitted in every subframe across the bandwidth. In addition, the new carrier type may allow the downlink control channels to be operated using UE-specific demodulation reference symbols. The new carrier type might be operated as a kind of extension carrier along with another LTE/LTE-A carrier or alternatively as standalone non-backward compatible carrier.

Figure 13:
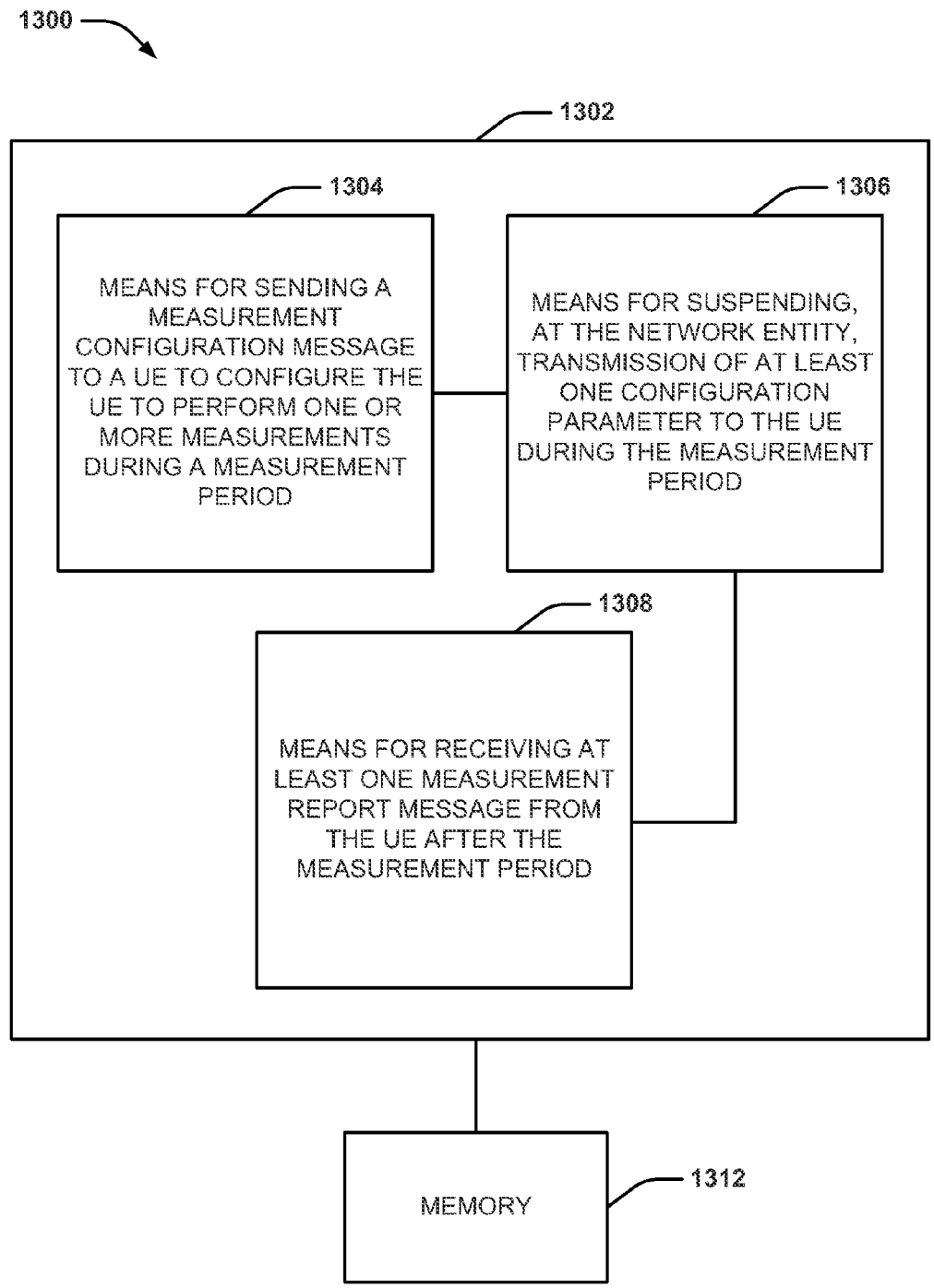
FIG. 13 illustrates an example system for detecting collisions in accordance with an aspect described herein.

Referring to FIG. 13, an example system 1300 for detecting collisions according to an aspect of the coordination component 132 (FIGS. 1, 2 and 4) is illustrated. For example, system 1300 can reside at least partially within a base station, network entity, mobile device, etc. It is to be appreciated that system 1300 is represented as including functional blocks, which can be functional blocks that represent functions implemented by a processor including collision detection component 130, software, or combination thereof (e.g., firmware). System 1300 includes a logical grouping 1302 of means that can act in conjunction. For instance, logical grouping 1302 can include means for sending a measurement configuration message to a UE to configure the UE to perform one or more measurements during a measurement period 1304. Further, logical grouping 1302 can comprise means for suspending, at the network entity, transmission of at least one configuration parameter to the UE during the measurement period 1306. Moreover, logical grouping 1302 can comprise means for receiving at least one measurement report message from the UE after the measurement period 1308. Thus, as described, the network entity may detect a conflict/collision with a neighboring network entity. Additionally, system 1300 can include a memory 1312 that retains instructions for executing functions associated with the means 1304, 1306 and 1308. While shown as being external to memory 1312, it may be understood that one or more of the means 1304, 1306 and 1308 may exist within memory 1312. Additionally, each of the means 1304, 1306 and 1308 may comprise one or more electrical components.

Figure 14:
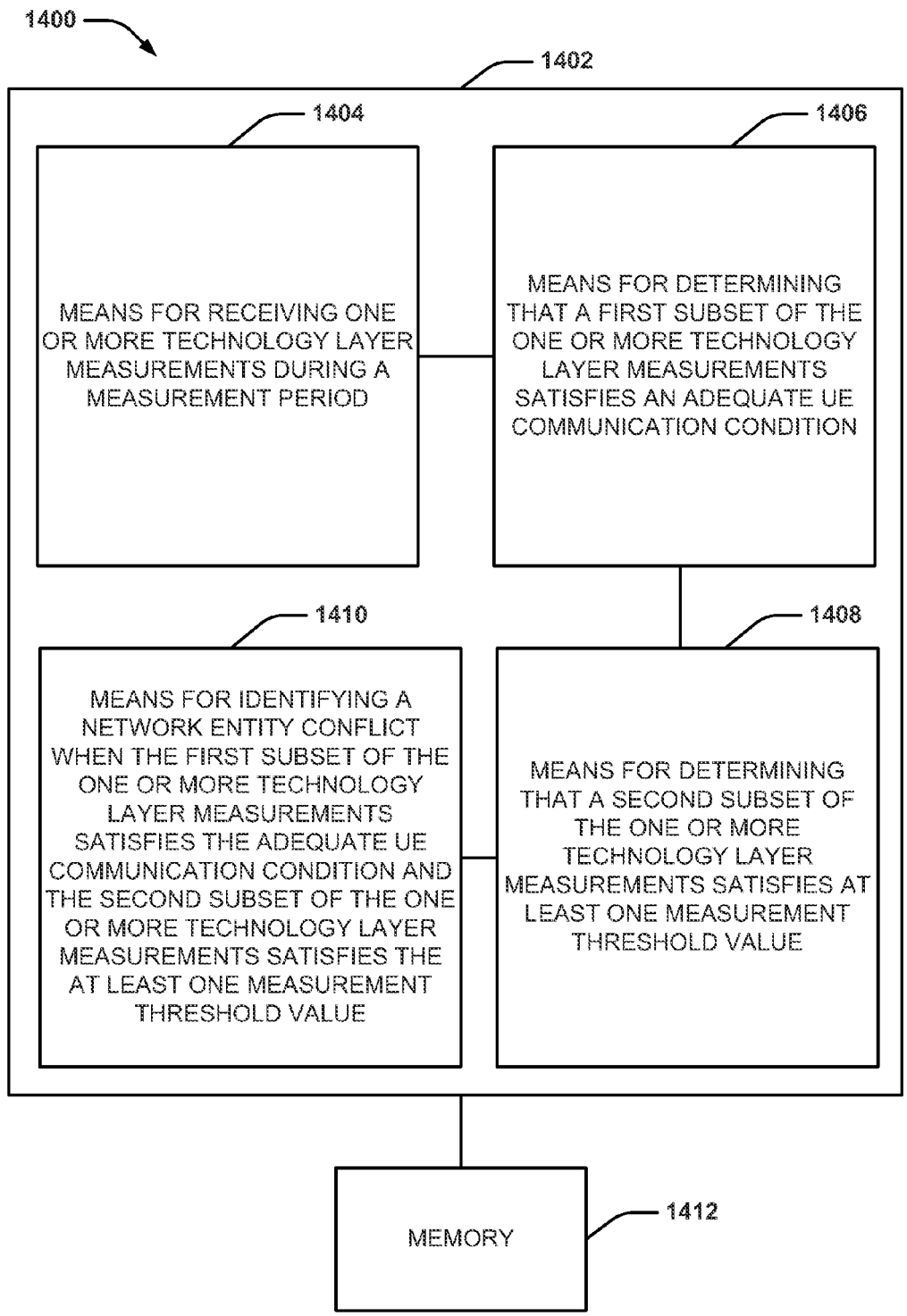
FIG. 14 illustrates an example system for detecting collisions in accordance with another aspect described herein.

Referring to FIG. 14, an example system 1400 for detecting collisions according to an aspect of the technology layer measurement component 134 (FIGS. 1, 3 and 5) is illustrated. For example, system 1400 can reside at least partially within a base station, network entity, mobile device, etc. It is to be appreciated that system 1400 is represented as including functional blocks, which can be functional blocks that represent functions implemented by a processor including collision detection component 130, software, or combination thereof (e.g., firmware). System 1400 may include a logical grouping 1402 of means that can act in conjunction. For instance, logical grouping 1402 can include means for receiving one or more technology layer measurements during a measurement period 1404. Further, logical grouping 1402 may comprise means for determining that a first subset of the one or more technology layer measurements satisfies an adequate UE communication condition 1406. Moreover, logical grouping 1402 may comprise determining that a second subset of the one or more technology layer measurements satisfies at least one measurement threshold value 1408. Additionally, logical grouping 1402 may comprise means for identifying a network entity conflict when the first subset of the one or more technology layer measurements satisfies the adequate UE communication condition and the second subset of the one or more technology layer measurements satisfies the at least one measurement threshold value 1410. Thus, as described, the network entity may detect a conflict/collision with a neighboring network entity. Additionally, system 1400 can include a memory 1412 that retains instructions for executing functions associated with the means 1404, 1406, 1408 and 1410. While shown as being external to memory 1412, it may be understood that one or more of the means 1404, 1406, 1408 and 1410 may exist within memory 1412. Additionally, each of the means 1404, 1406, 1408 and 1410 may comprise one or more electrical components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of communication, comprising:
   receiving, at one or more antennas of a serving small cell, one or more technology layer measurements during a measurement period;

determining, at a processor of the serving small cell, that a first subset of the one or more technology layer measurements satisfies an adequate user equipment (UE) communication condition;

determining, at the processor, that a second subset of the one or more technology layer measurements satisfies at least one measurement threshold value;

identifying, at the processor, a network entity conflict in which the serving small cell and a neighboring small cell transmit a same transmission-related parameter, the network entity conflict being identified when the first subset of the one or more technology layer measurements satisfies the adequate UE communication condition and the second subset of the one or more technology layer measurements satisfies the at least one measurement threshold value; and transmitting an indication to one or more small cells other than the serving small cell to begin a transmission-related parameter resolution procedure in response to identifying the network entity conflict, wherein the one or more small cells include the neighboring small cell.

2. The method of claim 1, wherein determining that the first subset of the one or more technology layer measurements satisfies an adequate UE communication condition comprises performing an arithmetic operation on the first subset of the one or more technology layer measurements to obtain an adjusted first subset of the one or more technology layer measurements.

3. The method of claim 2, wherein performing the arithmetic operation comprises obtaining an average value of the first subset of the one or more technology layer measurements.

4. The method of claim 2, wherein determining that the first subset of the one or more technology layer measurements satisfies an adequate UE communication condition comprises comparing the adjusted first subset of the one or more technology layer measurements to one or more corresponding measurement threshold values.

5. The method of claim 4, wherein the first subset of the one or more technology layer measurements comprises one or more of a reference signal receive power (RSRP) indication, a reference signal receive quality (RSRQ) indication, a channel quality indicator (CQI) indication, and a metric value derived from one of RSRP, RSRQ or CQI.

6. The method of claim 1, wherein determining that the second subset of the one or more technology layer measurements satisfies at least one measurement threshold comprises performing an arithmetic operation on the second subset of the one or more technology layer measurements to obtain an adjusted second subset of the one or more technology layer measurements.

7. The method of claim 6, wherein performing the arithmetic operation comprises obtaining an average value of a first measurement within the second subset of the one or more technology layer measurements based on one or both of a number of second measurements and a number of third measurements.

8. The method of claim 6, wherein determining that the second subset of the one or more technology layer measurements satisfies a measurement threshold value comprises comparing the one or more technology layer measurements to the measurement threshold value.

9. The method of claim 6, wherein the second subset of the one or more technology layer measurements comprises one or more of a block error rate (BLER) indication, an acknowledgment (ACK) or non-acknowledgment (NACK) indication and a CQI backoff indication, and a metric value derived from one of BLER, ACK, NACK and CQI backoff.

10. The method of claim 1, wherein the measurement period is configurable by a network entity.

11. A non-transitory computer-readable medium storing computer executable code, comprising:
   code for receiving, at one or more antennas of a serving small cell, one or more technology layer measurements during a measurement period;
   code for determining that a first subset of the one or more technology layer measurements satisfies an adequate user equipment (UE) communication condition;
   code for determining that a second subset of the one or more technology layer measurements satisfies at least one measurement threshold value;
   code for identifying a network entity conflict in which the serving small cell and a neighboring small cell transmit a same transmission-related parameter, the network entity conflict being identified when the first subset of the one or more technology layer measurements satisfies the adequate UE communication condition and the second subset of the one or more technology layer measurements satisfies the at least one measurement threshold value; and
   code for transmitting an indication to one or more small cells other than the serving small cell to begin a transmission-related parameter resolution procedure in response to identifying the network entity conflict, wherein the one or more small cells include the neighboring small cell.

12. An apparatus for communication, comprising:
   means for receiving, at one or more antennas of a serving small cell, one or more technology layer measurements during a measurement period;
   means for determining, connected to a memory, that a first subset of the one or more technology layer measurements satisfies an adequate user equipment (UE) communication condition;
   means for determining, connected to the memory, that a second subset of the one or more technology layer measurements satisfies at least one measurement threshold value;
   means for identifying, executed upon the memory, a network entity conflict in which the serving small cell and a neighboring small cell transmit a same transmission-related parameter, the network entity conflict being identified when the first subset of the one or more technology layer measurements satisfies the adequate UE communication condition and the second subset of the one or more technology layer measurements satisfies the at least one measurement threshold value; and
   means for transmitting an indication to one or more small cells other than the serving small cell to begin a transmission-related parameter resolution procedure in response to identifying the network entity conflict occurs, wherein the one or more small cells include the neighboring small cell.

13. An apparatus for communication, comprising:
   a memory of a serving small cell storing executable data; and
   a processor of the serving small cell in communication with the memory, wherein the processor is configured to execute instructions to process the data in the memory to:
      receive, at one or more antennas of the serving small cell, one or more technology layer measurements during a measurement period;

determine that a first subset of the one or more technology layer measurements satisfies an adequate user equipment (UE) communication condition;

determine that a second subset of the one or more technology layer measurements satisfies at least one measurement threshold value;

identify a network entity conflict in which the serving small cell and a neighboring small cell transmit a same transmission-related parameter, the network entity conflict being identified when the first subset of the one or more technology layer measurements satisfies the adequate UE communication condition and the second subset of the one or more technology layer measurements satisfies the at least one measurement threshold value; and transmit an indication to one or more small cells other than the serving small cell to begin a transmission-related parameter resolution procedure in response to identifying the network entity conflict, wherein the one or more small cells include the neighboring small cell.

14. The apparatus of claim 13, wherein to determine that the first subset of the one or more technology layer measurements satisfies an adequate UE communication condition, the processor is further configured to execute the instructions to perform an arithmetic operation on the first subset of the one or more technology layer measurements to obtain an adjusted first subset of the one or more technology layer measurements.

15. The apparatus of claim 14, wherein to perform the arithmetic operation, the processor is further configured to execute the instructions to obtain an average value of the first subset of the one or more technology layer measurements.

16. The apparatus of claim 14, wherein to determine that the first subset of the one or more technology layer measurements satisfies an adequate UE communication condition, the processor is further configured to execute the instructions to compare the adjusted first subset of the one or more technology layer measurements to one or more corresponding measurement threshold values.

17. The apparatus of claim 16, wherein the first subset of the one or more technology layer measurements comprises one or more of a reference signal receive power (RSRP) indication, a reference signal receive quality (RSRQ) indication, a channel quality indicator (CQI) indication, and a metric value derived from one of RSRP, RSRQ or CQI.

18. The apparatus of claim 13, wherein to determine that the second subset of the one or more technology layer measurements satisfies at least one measurement threshold, the processor is further configured to execute the instructions to perform an arithmetic operation on the second subset of the one or more technology layer measurements to obtain an adjusted second subset of the one or more technology layer measurements.

19. The apparatus of claim 18, wherein to perform the arithmetic operation, the processor is further configured to execute the instructions to obtain an average value of a first measurement within the second subset of the one or more technology layer measurements based on one or both of a number of second measurements and a number of third measurements.

20. The apparatus of claim 18, wherein to determine that the second subset of the one or more technology layer measurements satisfies a measurement threshold value, the processor is further configured to execute the instructions to compare the one or more technology layer measurements to the measurement threshold value.

21. The apparatus of claim 18, wherein the second subset of the one or more technology layer measurements comprises one or more of a block error rate (BLER) indication, an acknowledgment (ACK) or non-acknowledgment (NACK) indication and a CQI backoff indication, and a metric value derived from one of BLER, ACK, NACK and CQI backoff.

22. The apparatus of claim 13, wherein the measurement period is configurable by a network entity.

* * * * *